United States Patent
Roeingh et al.

(10) Patent No.: US 7,611,150 B2
(45) Date of Patent: Nov. 3, 2009

(54) SEALING DEVICE COMPRISING A TWO-PIECE ANNULAR BODY

(75) Inventors: Konrad Roeingh, Hilchenbach (DE); Karl Keller, Hilchenbach (DE)

(73) Assignee: SMS Demag AG, Düsseldorf (DE)

( * ) Notice: Subject to any disclaimer, the term of this patent is extended or adjusted under 35 U.S.C. 154(b) by 594 days.

(21) Appl. No.: 10/501,708

(22) PCT Filed: Feb. 22, 2003

(86) PCT No.: PCT/EP03/01815

§ 371 (c)(1), (2), (4) Date: Jul. 16, 2004

(87) PCT Pub. No.: WO03/078085

PCT Pub. Date: Sep. 25, 2003

(65) Prior Publication Data

US 2005/0035561 A1  Feb. 17, 2005

(30) Foreign Application Priority Data

Mar. 15, 2002  (DE) .............................. 102 11 665

(51) Int. Cl.
*F16J 15/32* (2006.01)
(52) U.S. Cl. ..................... 277/349; 277/565; 73/236; 384/296
(58) Field of Classification Search ................. 277/349, 277/402, 565; 72/236; 384/147, 130, 280, 384/296

See application file for complete search history.

(56) References Cited

U.S. PATENT DOCUMENTS

| 3,106,405 | A | * | 10/1963 | Pringle | 277/423 |
| 4,022,480 | A | * | 5/1977 | Salter, Jr. | 277/367 |
| 4,063,743 | A | * | 12/1977 | Petros | 277/563 |
| 4,099,731 | A |   | 7/1978 | Salter, Jr. | |
| 4,234,196 | A | * | 11/1980 | Iida | 277/565 |
| 6,375,195 | B1 | * | 4/2002 | Robotham | 277/394 |

FOREIGN PATENT DOCUMENTS

EP  1038601  9/2000

OTHER PUBLICATIONS

Patent Abstracts of Japan, vol. 2000, No. 24, May 11, 2001 & JP 2001 205314 A (NOK Corp), Jul. 31, 2001.

* cited by examiner

*Primary Examiner*—Vishal Patel
(74) *Attorney, Agent, or Firm*—Friedrich Kueffner

(57) ABSTRACT

Disclosed is a sealing device (16) for a rotatably mounted roll (15). Said sealing device (16) comprises at least one annular body which sits on a roll neck (2), encompasses said roll neck (2), and is provided with at least one outward-extending lip (21) that rests in a sealing manner against a stationary part (7) during rotation of the roll. Said ring body is embodied in at least two pieces (17; 18), one first piece (17) resting against one part (2) of the roll (15) and one second piece (18) encompassing at least one outward-extending lip (21, 22).

7 Claims, 2 Drawing Sheets

SEALING DEVICE COMPRISING A TWO-PIECE ANNULAR BODY

BACKGROUND OF THE INVENTION

1. Field of the Invention

The invention concerns a sealing device for a rotatably supported roll of a rolling device and a rolling device.

2. Description of the Related Art

Rolling devices of the specified type are used, for example, in rolling mills in the steel industry and nonferrous metal industry. They include sealing devices in the area of the bearing of the load-bearing roll(s).

The sealing devices seal rotatably supported rolls and near the roll bearings are assigned to the roll necks, which are mounted in axially outer areas. The seal can act both to prevent the escape of lubricant from the bearing, e.g., a fluid-film bearing, towards the roll barrel and to prevent the escape of coolant, which in some cases is mixed with scale, towards the bearing. In this regard, there are sealing devices, which are mounted in a stationary way on a chock and have sealing lips, whose free ends rest against the roll necks, which rotate during operation. In the meantime, on the other hand, in many cases sealing devices of this type are being used that have sealing lips that co-rotate with the roll neck, such that the free ends of these sealing lips press against the stationary opposing part with the assistance of centrifugal force to improve the sealing effect. Sealing devices of this type are often referred to as X seals or DF seals.

SUMMARY OF THE INVENTION

High stability requirements are placed on the part of the seal that rests against the corresponding roll; in any event, lifting of this part must be avoided. On the other hand, the sealing lips require high elasticity, by which their contact against the stationary opposing part must be guaranteed at all times. At the same time, however, the surface should have sufficient hardness to largely avoid wear despite the relative motion that occurs.

The objective of the invention is to optimize sealing devices and rolling devices with respect to these requirements.

In accordance with the invention, the sealing part has a multipart design. This multipart design of the sealing part that rotates with the roll takes into account the various requirements within the sealing device which are outlined above.

If, as is especially advantageous, the material properties with respect to hardness and/or elasticity vary among the parts, precisely these critical parameters can each be adjusted in an optimum way.

Outstanding mechanical stability can be achieved if the second part, which bears the lip or lips, is held in a pocket of the first part, which rests against the roll neck.

It is also especially advantageous for the seal if at least two lips are provided, one of which is directed outward, while the other is directed inward.

In addition, spring loading can be used to optimize the lip/lips with respect to their contact pressure on the stationary part.

BRIEF DESCRIPTION OF THE DRAWING

Other advantages and features of the invention are described below with reference to an embodiment of the object of the invention illustrated in the drawings.

DETAILED DESCRIPTION OF THE INVENTION

Figure 1:
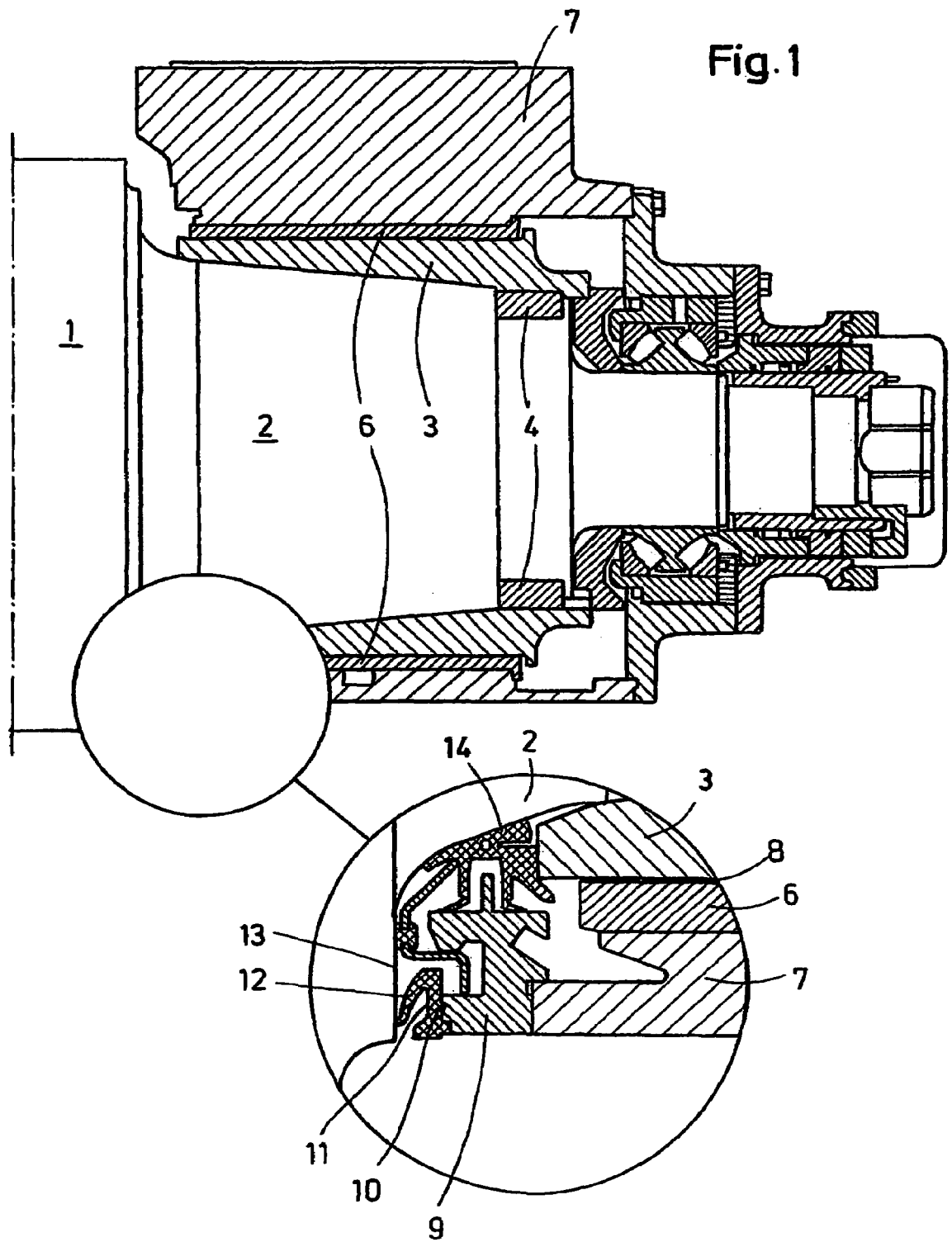
FIG. 1 shows a sectional view of a roll sealed in accordance with the state of the art with accentuated detail of the conventional sealing device, which has a part that rotates with the roll and carries sealing lips.

In accordance with the prior art (FIG. 1), rolls 1, of which only the axially ends of the bearing necks 2 are shown here in detail, and which are held in rolling devices, are designed in such a way that the bearing necks 2 are each pressed into bushings 3 which encompass them. Feather keys 4 can be provided to secure the bushings 3 on the bearing necks 2.

The bushings 3 are rotatably supported in bearing bushings 6, which in turn are held in chocks 7, which are located in a radially outward position.

Lubrication is provided between the bushings 3 and the bearing bushings 6. A liquid lubricant 8, such as an oil, is shown in the drawing.

An inner cover plate 9 is mounted on each chock 7 on the end facing the barrel of the roll 1. The inner cover plate 9 supports a coolant deflector 11 on its face 10 that faces the barrel of the roll 1. The coolant deflector 11 has an elastic bracket 12, whose free end extends during operation to an axially outwardly directed face 13 of the bearing neck 2. In addition, a seal 14 is provided, which is formed as a single piece and rotates with the roll neck 2.

Figure 2:
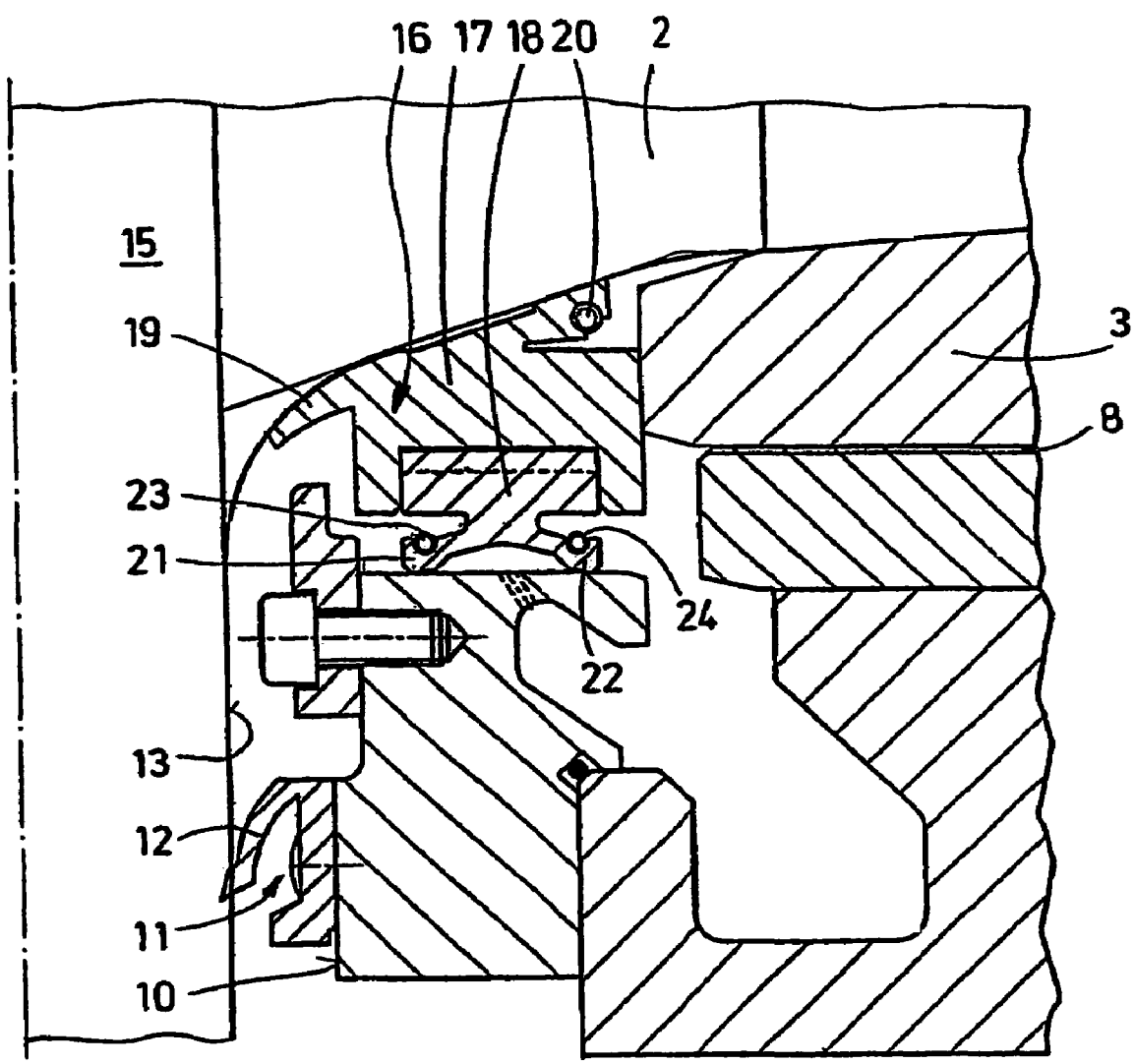
FIG. 2 shows a sectional view of the sealing device of the invention.

The embodiment of the invention shown in FIG. 2 has a roll 15, which in itself and with respect to the parts 2 to 13 that are stationary (except for the nonstationary bushings 3 and the lubricant 8) basically corresponds to the parts 1 to 13 shown in the drawing of a prior-art device in FIG. 1.

In accordance with the invention, instead of the seal 14, the sealing device 16 is provided, which comprises at least two parts (17, 18) that rotate with the roll 15.

The part 17 rests against the bearing neck 2 and for this purpose has an extension 19 that follows the running direction of the bearing neck 2 and fits closely against it. This ensures secure contact that prevents the sealing device 16 from lifting off the bearing neck 2. The bearing neck 2 can have a variety of diameters.

The first sealing part 17 can be secured on the roll neck 2 by the clamping ring 20.

The second part 18 consists of a material that is different with respect to its elasticity and surface hardness, for example, a different rubber material. This makes it possible to ensure permanent elasticity, especially of the sealing lips 21, 22 that are part of the second part 18 and were subject to rapid wear in previous designs. To achieve this, a high degree of elasticity of the part 18 is advantageous, combined with high surface hardness, especially of the lips 21, 22, which are in frictional contact with the chock 7.

Provided that two lips 21 and 22 are present, which are directed in opposite axial directions, a good sealing effect is guaranteed. In this regard, the two sealing lips 21 and 22 can be supported in their contact pressure against the chock 7 or other stationary abutment by inserted springs 23 and 24. A high eccentricity is possible in this way. The sealing lips 21 and 22 can, for example, also each form an individual outer annular part and must not be joined together as a single part.

Furthermore, the mechanical service life is improved if the part 18 is held in a pocket of the first part 17, which rests against the roll neck 2. In particular, the walls of the pocket support the part 18 from forces acting in the axial direction. In this way, forces acting axially on the sealing lips 21, 22 can also be absorbed without displacing the sealing lips 21, 22 or even endangering the seat of the entire sealing device 16.

A roll 15 with a sealing device 16 can be used as a unit component of a rolling device that comprises, for example, a multiple-roll stand with several work rolls and several backup rolls. It is also possible to design a rolling stand with additional intermediate rolls between the work rolls and the backup rolls.

Therefore, the invention also claims rolling devices with the above sealing devices with a variety of numbers and geometric arrangements of rolls.

LIST OF REFERENCE NUMBERS 1. roll
2. bearing neck
3. bushings
4. feather keys
5. --
6. bearing bushings
7. chocks
8. lubricant
9. cover plate
10. face
11. coolant deflector
12. bracket
13. face
14. seal
15. roll
16. sealing device
17. first part of the sealing device
18. second part of the sealing device
19. extension of the first part
20. clamping ring
21. lip
22. lip
23. spring
24. spring

The invention claimed is:

1. Sealing device (16) for a rotatably supported roll (15), the sealing device comprising at least one annular body, which is supported on a roll neck (2) and encompassing said roll neck, the annular body being provided with at least one outwardly extending lip (21; 22) that rests against and seals a stationary part (7) during rotation of the roll, wherein the annular body comprises at least two parts (17; 18), wherein a first part (17) rests against a part (2) of the roll (15), and a second part (18) comprises the at least one outwardly extending lip (21; 22), and wherein the second part (18) is held in a pocket of the first part (17), wherein the at least one lip is spring-supported.

2. Sealing device in accordance with claim 1, wherein the first part (17) and the second part (18) have different moduli of elasticity.

3. Sealing device in accordance with claim 1, wherein the first part (17) and the second part (18) have different surface hardness values.

4. Sealing device in accordance with claim 1, wherein the first part (17) and the second part (18) consist of different materials.

5. Sealing device in accordance with claim 1, wherein the second part (18) comprises at least one lip (21) directed axially in the direction of the barrel of the roll (15) and one lip (22) directed axially in the opposite direction.

6. Sealing device in accordance with claim 5, wherein the lip or lips (21; 22) consist of an elastic rubber material.

7. Rolling device with at least one roll (15) rotatably supported in a stand and with at least one sealing device that seals the roll against a stationary area (7) of the rolling device, wherein the sealing device (16) comprises at least one annular body supported on a roll neck (2) and encompassing said roll neck, the annular body being provided with at least one outwardly extending lip (21; 22) that rests against and seals a stationary part (7) during rotation of the roll, wherein the annular body comprises at least two parts (17; 18), wherein a first part (17) rests against a part (2) of the roll (15), and a second part (18) comprises the at least one outwardly extending lip (21; 22), and wherein the second part (18) is held in a pocket of the first part (17) ), wherein the at least one lip is spring-supported.

* * * * *